(12) United States Patent
Olapurath et al.

(10) Patent No.: US 6,678,714 B1
(45) Date of Patent: Jan. 13, 2004

(54) COMPUTER-IMPLEMENTED TASK MANAGEMENT SYSTEM

(75) Inventors: John Olapurath, Nashua, NH (US); Rajiv Sodlapur, Manchester, NH (US); Roel Vlemmings, Manchester, NH (US)

(73) Assignee: TaskServer.com, Inc., Nashua, NH (US)

( * ) Notice: Subject to any disclaimer, the term of this patent is extended or adjusted under 35 U.S.C. 154(b) by 0 days.

(21) Appl. No.: 09/438,446

(22) Filed: Nov. 12, 1999

Related U.S. Application Data

(60) Provisional application No. 60/108,538, filed on Nov. 16, 1998.

(51) Int. Cl.[7] .................................................. G06F 9/00
(52) U.S. Cl. .............................. 709/104; 705/8; 705/9
(58) Field of Search ............................ 709/104; 705/8, 705/9

(56) References Cited

U.S. PATENT DOCUMENTS

| | | | | |
|---|---|---|---|---|
| 5,765,140 A | * | 6/1998 | Knudson et al. ............... 705/9 |
| 5,893,074 A | * | 4/1999 | Hughes et al. .................. 705/8 |
| 6,101,481 A | * | 8/2000 | Miller ............................ 705/9 |
| 6,148,290 A | * | 11/2000 | Dan et al. ....................... 705/1 |
| 6,308,164 B1 | * | 10/2001 | Nummelin et al. ............. 705/9 |

* cited by examiner

Primary Examiner—Anil Khatri
Assistant Examiner—Thomas Pham
(74) Attorney, Agent, or Firm—Bourque & Assocs., PA

(57) ABSTRACT

A task management system including a task server linking a plurality of system users, including at least one task definer, at least one task requester and at least one task fulfiller over a communications link. The task server includes a task processor for processing tasks, a task memory for storing task definitions and one or more graphical user interfaces (GUIs) for interfacing the system users to the task server to facilitate operation of said task processing system. The GUIs include task view interfaces, task fulfiller interfaces, which are used by task requesters and task fulfillers to request and fulfill tasks, respectively. The GUIs also include a plurality of administrative editor interfaces, which are used by task definers to define, group and sequence tasks.

7 Claims, 14 Drawing Sheets

FIG. 6

Contact Details

| | | |
|---|---|---|
| Salutation: | Mr ▽ | Last Name: Lorenzo |
| Mid Name: | | First Name: Fabricio |
| Address: | 123 Rue Venetia | |
| City: | Venice | State: |
| Country: | Italy | Zip: 1235 AZ ▽ |
| Company: | Lucky Coin Company ▽ | Department: Shipping |
| Title: | Shipping Clerk | |
| Phone No: | 839-210118 | Ext Number: x34585 |
| Fax No: | 839-210119 | E-mail Address: lorenzo@lucky-coin.com |
| Cellular Number: | | Pager Number: |

OK    Cancel

COMPUTER-IMPLEMENTED TASK MANAGEMENT SYSTEM

RELATED APPLICATIONS

This application is related to and claims the benefit of Provisional U.S. patent application Ser. No. 60/108,538 filed on Nov. 16, 1998 entitled System and Method of Creating and Manipulating Tasks, assigned to the Assignee of the present invention, and incorporated herein by reference.

FIELD OF THE INVENTION

The disclosed invention comprises a system and method of creating and managing tasks, including techniques, environment and abstractions to define, create, group, sequence, store, retrieve, assign, request, route, fulfill, view, organize and attach documents/objects to "tasks".

BACKGROUND OF THE INVENTION

Database servers are well known to those skilled in the art. A database server provides data related services such as store, retrieve, relate, view, manipulate and organize data. However, data is static in nature. In other words, a data element is a passive element that represents a unit of information.

On the other hand, unlike a data element a "task" is an active element that represents a unit of work or action. Unfortunately, prior art database servers are not equipped to handle active elements, such as tasks.

Accordingly, what is need is a system and method of creating and manipulating tasks, which can organize and manage dynamic, active task elements. Preferably, such a system and method would also account for the fact that often times task elements are interrelated and conditioned upon the occurrence of previously performed tasks.

SUMMARY OF THE INVENTION

The disclosed invention provides such a system and method in the form of a "task server", which provides a single environment to provide task related services. The disclosed task server provides task related services.

The system includes a task server linking at least one task definer, at least one task requester and at least one task fulfiller over a communications link. The task server includes a task processor for processing tasks, a task memory for storing task definitions and one or more graphical user interfaces (GUIs) for interfacing the system users to the task server to facilitate operation of said task processing system. The GUIs include task view interfaces, task fulfiller interfaces, which are used by task requesters and task fulfillers to request and fulfill tasks, respectively. The GUIs also include a plurality of administrative editor interfaces, which are used by task definers to define, group and sequence tasks.

The task server also provides an Application Programming Interface (API), which an application can use to communicate with and obtain services from the task server. Preferably, the disclosed task server is implemented using a large scale computer network, such as the Internet. In such an embodiment, end users can access and use the disclosed task server from any location using an standard computer, configured to communicate with the task server over the Internet using a standard Internet browser.

DESCRIPTION OF THE DRAWINGS

These and other features and advantages of the present invention will be better understood by reading the following detailed description, taken together with the drawings wherein:

FIG. 6 is a Task Editor display according to one embodiment of the present invention.

FIG. 14 is a Contact Editor display according to one embodiment of the present invention.

DETAILED DESCRIPTION OF THE PREFERRED EMBODIMENT

The disclosed invention will be described making reference to one exemplary embodiment of the invention. However, the following example should, in no way, limit the scope of the invention as the principals can be applied equally to any number of applications. Before proceeding with the detailed description, it will be helpful to provide some basic definitions that will be used throughout this specification.

"Task" —A task is a unit of work that is requested by a "Requestor" and fulfilled by a "Fulfiller." Tasks are active elements.

"Task Group"—A task group is a group of related Tasks. Tasks in a group may be sequenced or conditioned upon the occurrence of one or more prerequisite tasks.

"Requestor"—A requester is a person or software object that requests the execution of a task or task group.

"Fulfiller"—A fulfiller is a person, or a software object, that fulfills a Task.

Figure 1:
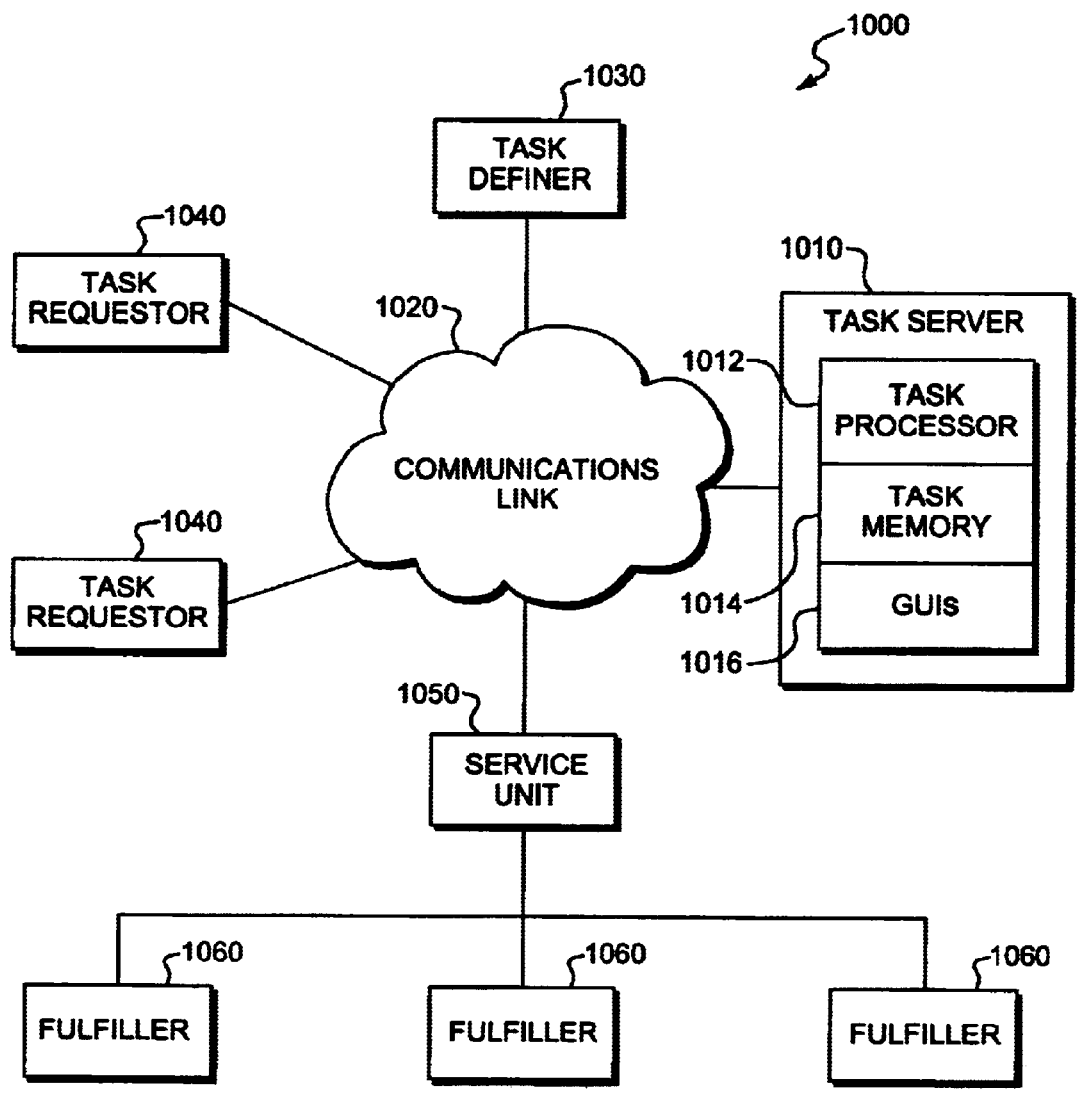
FIG. 1 is a block diagram showing a task server according to the present invention linking at least one task definer to at least one task requester and at least one task fulfiller over a communications link.

Turning now to the figures and in particular, FIG. 1, a system 1000 of creating and manipulating tasks according to the present invention is shown. The system 1000 includes a task server 1010, which links, over a communications link 1020, at least one task definer 1030 with at least one task requester 1040 and at least one task fulfiller 1060.

In one embodiment, the communications link 1020 comprises a large scale computer network, such as the Internet. However, the system may be provided on a less global scale whereby the communications link 1020 may include a local are network (LAN) or a wide area network (WAN).

The task fulfillers 1060 may be grouped together by a service unit 1050, which would act as an intermediary between each task fulfiller 1060 and the task server 1010. The task server includes a task processor 1012 for processing tasks and at least one task memory 1014 for storing task definitions and other parameters related to individual tasks, which will be discussed more fully below.

The system 1000 and its operation will be discussed by way of an example, which will illustrate the principles of the disclosed invention. Consider the Human Resources department of a company and the specific function of adding a new employee to that company. A number of tasks need to be performed: an office cubicle must be assigned to the new employee; a computer must be installed in the assigned cubicle; a phone must be installed; an e-mail account must be added; an employee id must be assigned; an employee badge must be created; the new employee's name must be added to the company phone directory; the employee must be included in the company's payroll system; etc.

Assign Office Cubicle, Install Computer, Assign Employee ID, etc. represent individual tasks. As previously defined, a task is an atomic unit of work from the perspective of a system user. System users include task definers 1030, task requesters 1040 and task fulfillers 1060.

Tasks are defined by the task definer 1030. The task server 1010 provides the facility to define tasks. Once defined, tasks are stored in task memory 1040 for later retrieval and fulfillment at the request of a task requester 1040. Once a task is defined, an instance of the task is created upon the request of a system user.

Using the disclosed task server, a task definer 1030 can also define a task group, which would link a group of related tasks. For example, all of the tasks associated with the addition of a new employee can be grouped into a task group named "Add Employee". The Add Employee task group would comprise all of the above-mentioned tasks. A requestor 1030 can then request this single, defined task group and the task server 1010 will then route all of the component tasks in the defined task group to their respective fulfillers 1060.

Task Groups are defined using a Task Group Editor Interface, which will be discussed more fully below. Of importance to the disclosed invention is that the task server allows tasks within a task group to be sequenced, which will also be discussed more fully below. For example, the "Install Computer" task cannot be fulfilled until the "Assign Office Cubicle" task is completed. In other words a task definer 1030 can define the order in which tasks in a task group are to be executed. This function is performed using a Sequence Editor 1018, which is also included in the task server 1010.

The task server 1010 also provides a plurality of graphical user interfaces (GUIs) 1016, which facilitate the operation of the system by the system users. One family of GUIs that are provided are "Task Views". Task Views allow system users to view tasks and task groups on a display in an organized manner. Task Views are an important method of displaying all of the tasks and task groups that a system user may desire to see. In the Task View, tasks and task groups are organized in a tree view format. Very importantly, these tasks and task groups can be grouped under user defined folders within a tree.

For example, task services provided by the Human Resources department can be shown under a Human Resources folder, and services provided by Information Systems (IS) group can be shown under an IS folder within this group. Of course, folders can include sub-folders, which may be associated with individual work groups or individuals within a department who would be ultimately responsible for the completion of a specific task. Thus, the use of trees and folders allows for the organization and presentation of available tasks to a user in a more usable format.

Figure 2:
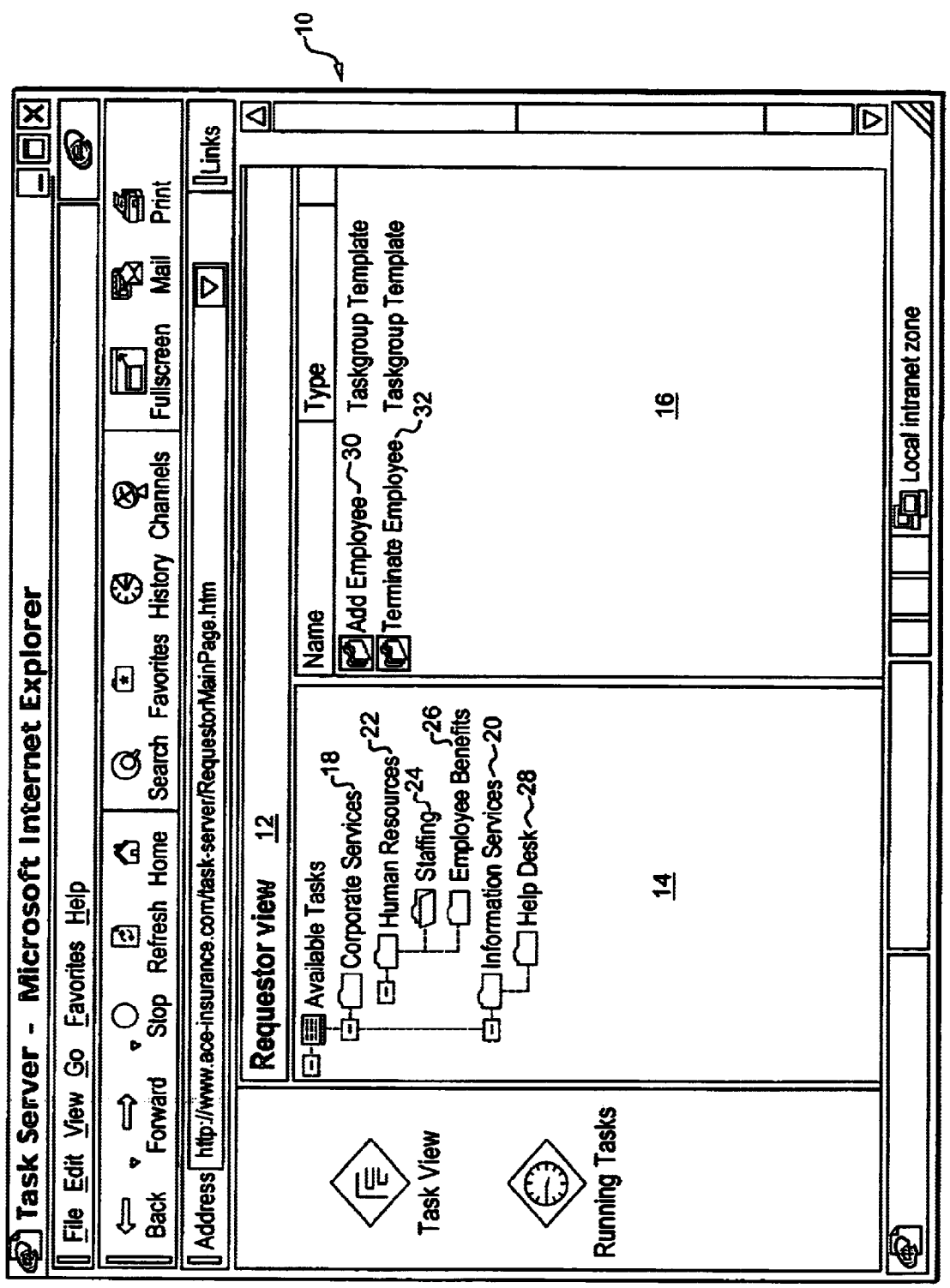
FIG. 2 is a Task View display according to one embodiment of the present invention, which displays View folders and their associated tasks and task groups.

FIG. 2 shows an example of a Task View interface 10. The Task View interface 10 includes a number of windows, including a user identification window 12, a task folder window 14 and the actual task window 16. In the example of FIG. 2, the user identification window 12 indicates that the specific task view being displayed is a "Requestor View", which would be viewed by a task requester 1040 (FIG. 1). The Requester View displays the available task folders for Corporate Services 18 and Information Services 20.

As indicated above, some folders may have sub-folders, such as is the case for the Corporate Services folder 18. In this case, the Corporate Services Folder 18 includes a sub-folder for Human Services-related tasks 22, which itself has sub-folders for Staffing and Employee Benefits-related tasks 24 and 26, respectively. Likewise, the Information Services folder 20 includes a sub-folder for Help Desk tasks 28.

In the example shown in FIG. 2, the Staffing sub-folder 24 is open. Thus, the task groups associated with the staffing function are displayed in the task window 16. These task groups include an Add Employee group 30 and a Terminate Employee group 32. These groups would include all of the individual tasks associated with either the addition or termination of an employee.

Task Views can be tailored for each user. For example, only a supervisor in the Human Resources department may have the Add Employee task group displayed and available for selection in his or her Requestor View. Task Views available to other employees may not have the Add Employee task group. In other words, the available Task Views are a function of a user's Role.

A task requester requests a task or task group by locating it in his or her Task View and then double clicking it using a "mouse" user input device or performing a corresponding keyboard or action using an alternative user input device. Task Views are created with the Task View Editor.

Once a task is requested, the requested task is routed to a Service Unit 1050 (FIG. 1) . A Service Unit represents one or more Fulfillers 1060 with specific skills. A task is associated with a Service Unit. It is this associated Service Unit that a requested task is routed to, which will be discussed more fully below with respect to the Service Provider Editor.

A task routed to a Service Unit is assigned to a Fulfiller associated with that Service Unit. Various rules are used to make an intelligent assignment.

Figure 3:
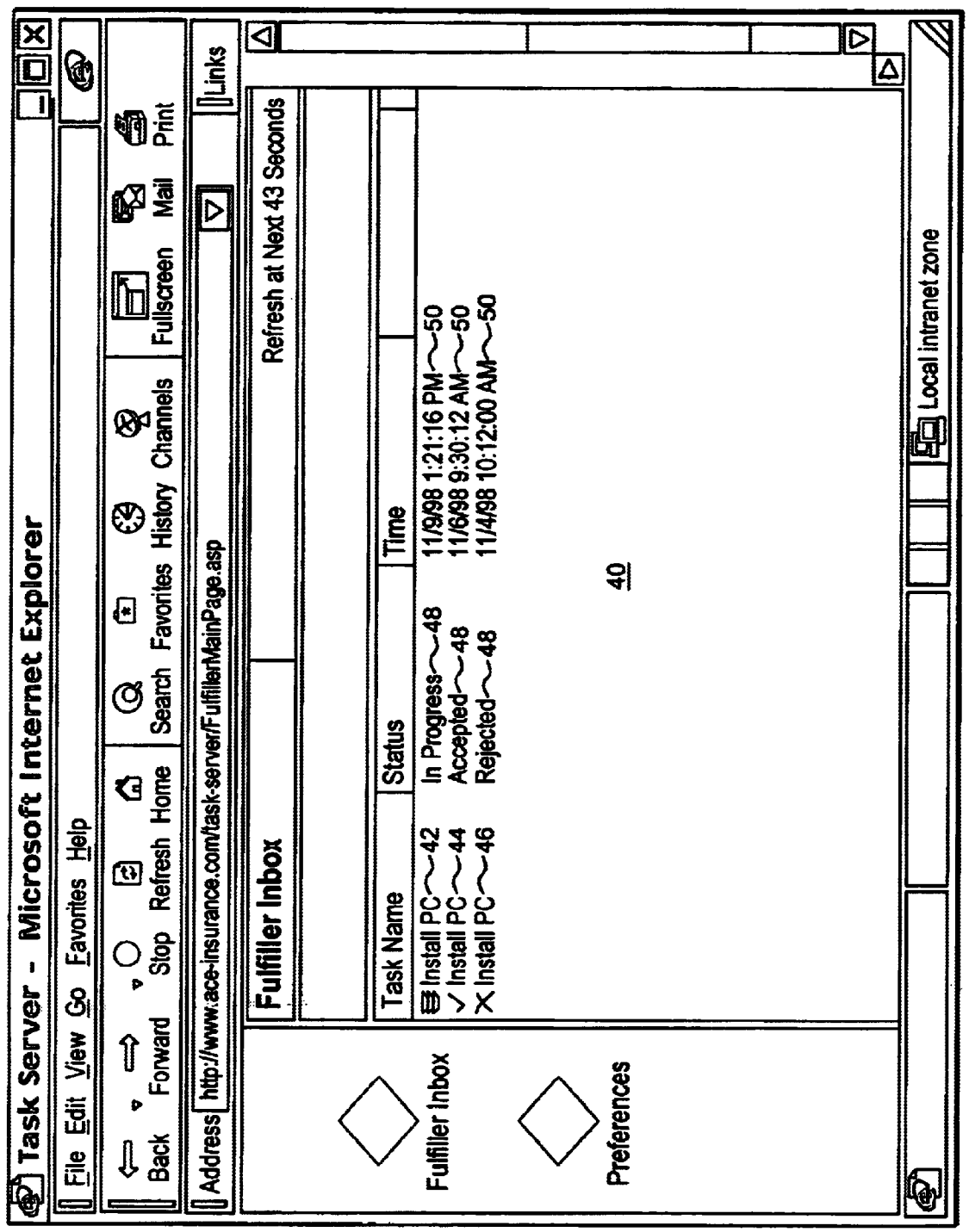
FIG. 3 shows a Fulfiller Inbox display, wherein specific tasks assigned to a particular task Fulfiller are displayed.

Tasks assigned to a Fulfiller are displayed on another system user (GUI) and in particular a Fulfiller interface 40 (FIG. 3). The Fulfiller Inbox display 40 displays those requested tasks 42, 44, and 46 that have been assigned to the specific task fulfiller. Double clicking or otherwise invoking a task in the Fulfiller interface 40 displays an additional GUI, which contains the information needed by the Fulfiller to fulfill the task. The displayed task screen may provide the detailed instructions as to how a complicated task must be performed, including all of the steps associated therewith. It may also provide a complete list of all the materials that will be required by the Fulfiller in order to complete the assigned task. The Fulfiller uses this information, such as the detailed instructions to perform the task. Once a Fulfiller has performed a Task, he or she informs the task server of the same.

The Requester of that Task is also notified. As shown on Fulfiller interface 40, the task status 48 is displayed as well as the date and time 50 that the most recent status was reported.

When a Requester invokes a Task Group, a number of GUI screens, each representing a component tasks that the group comprises, are displayed in sequence. Tasks that make up a Task Group may have common fields, such as employee name or employee ID. The Requestor does not have to enter the same information repeatedly in the ensuing screens representing each task in a group. The value for a duplicate field is entered only once. This value is automatically filled in when the field appears in a subsequent screen.

Documents and software objects can be attached to a task. These are attached by the Requestor and are made available to the Fulfiller. This feature can be used to build document routing/approval systems as explained later.

Serving Multiple Companies

The disclosed task server is not limited to in-house task automation. It is designed around a service provider—service acceptor principle. A Service Provider is a company that offers a range of services (for example, tasks and task groups) that can be requested by a Service Acceptor. Within the task server, a Service Provider can provide services to many Service Acceptors, which may represent one or more companies, departments, or other organizations.

Figure 4:
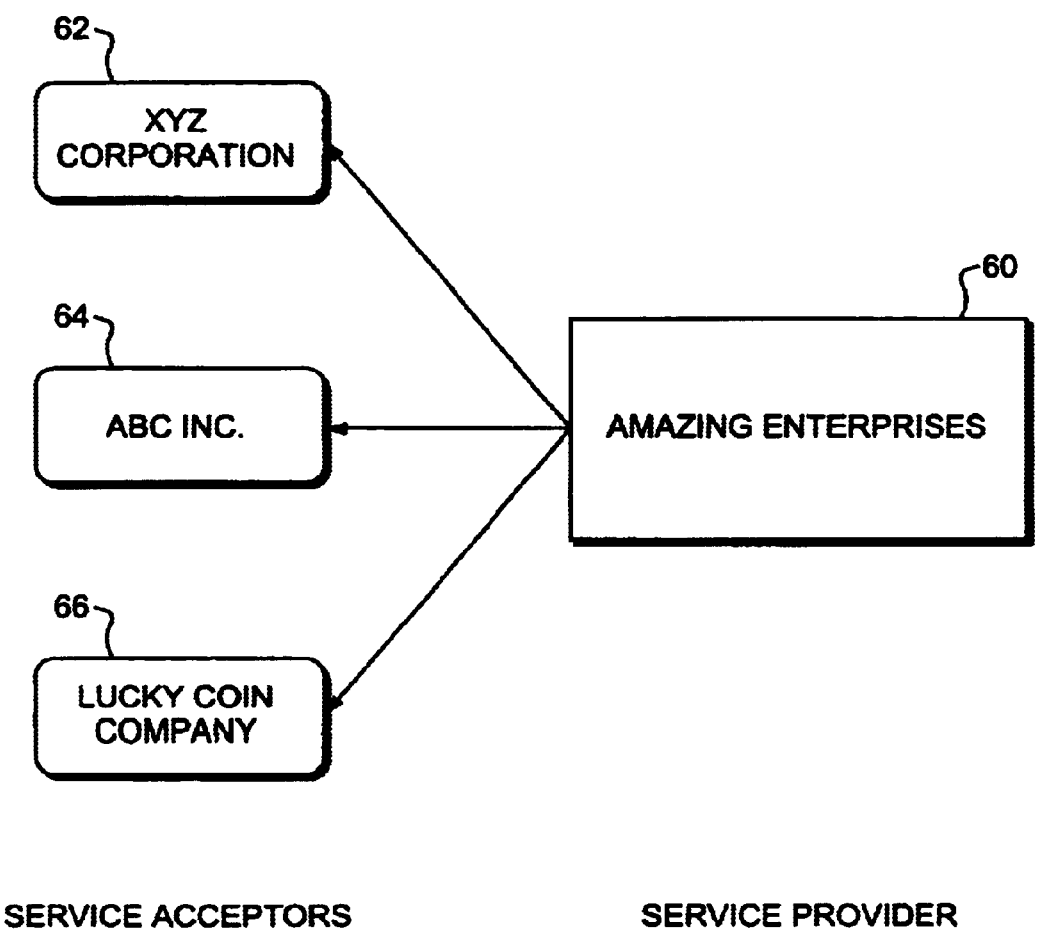
FIG. 4 is a block diagram showing how a single Service Provider can implement tasks for a plurality of Service Acceptors.

FIG. 4 is a block diagram showing how one Service Provider 60 may provide tasks or task groups for more than one service Acceptor. In this example, a Service Provider, "Amazing Enterprises" 60, provides services to three Service Acceptors, XYZ Corporation 62, ABC Inc. 64 and the Lucky Coin Company 66.

The exact relationship between each Service Acceptor and its Service Provider is a Service Agreement. For example, Amazing Enterprises might offer hundreds of Tasks and Task Groups as services. The agreement defines which of those are available to a particular Service Acceptor. This introduces the possibility of offering different sets of services to different Service Acceptors.

To further enhance flexibility and tailoring to individual organizational needs, the task server supplies role definitions on an agreement basis. The example below illustrates this feature.

Imagine that Lucky Coin Company has an agreement with Amazing Enterprises for a set of services. This means that employees within Lucky Coin can browse to the Amazing Enterprises site and request certain services by initiating the tasks and task groups. Now it may very well be possible that Lucky Coin Company does not want all it's employees to be able to request all of the services. Maybe a regular employee should be able to request only a certain number of services, whereas a first-line manager has access to more services and the upper-level managers can initiate the full range.

The task server offers support for this scheme. For every Agreement an unlimited number of Roles can be defined. A different Task View can be associated with each defined Role. The Task View determines which of the tasks and Task groups available in the Agreement will be visible to the end-user belonging to a particular Role. As indicated above, each Task View includes folders arranged in a directory-like hierarchy (FIG. 2)

This functionality makes the task server ideally suitable for automating systems such as Customer Support Services and Internet Commerce systems.

For in-house task automation, the folders displayed in the Task View are used to represent different departments so that an end-user, depending on his role, has access to only certain services offered by different departments.

Task Server Administrative Editors

Before a specific organization can utilize the task server, it should be tailored to that organization. Tasks need to be created, task groups assembled, Service Providers, Agreements, Roles and Views defined, etc.

To facilitate this process, the task server is provided with a suite of easy-to-use GUIs called Administrative Editor Interfaces or simply Administrative Editors.

Field Editor

A Task is basically an assignment for some kind of active work element to be performed by a Fulfiller. To be able to carry out this "task", the Fulfiller will often need information. Consider, for example, the Task "Install Memory in Employee's PC". The Fulfiller may need to know which employee and how much memory is to be installed.

This implies that when a Requestor initiates a task a screen should appear in which to enter the required information for this Task. The fields in this screen can be defined in the Field Editor and associated with the task. The type of fields may vary from simple text boxes to more sophisticated things like secure fields, pen-based signature authorization and file attachments.

Figure 5:
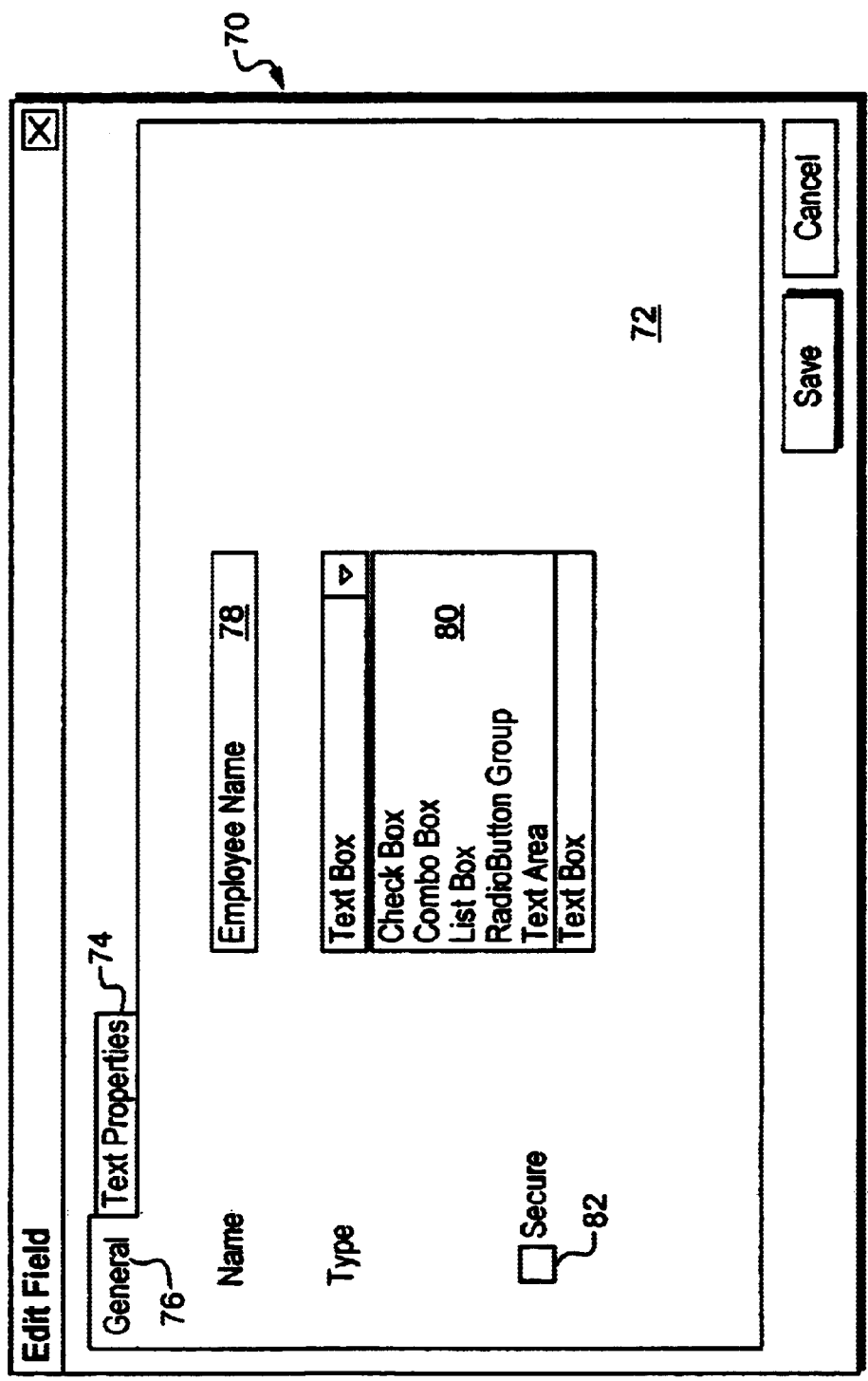
FIG. 5 is a Field Editor display according to one embodiment of the present invention.

FIG. 5 shows a Field Editor interface 70. Field Editor interface 70 includes at least one tile, such as the General tile 72 shown. Additional tiles, such as the Text Properties tile 74 may also be included. However, according to standard Windows conventions, a single tile will be displayed in the foreground, which additional tiles will be masked by the foreground tile. The different tiles can be easily brought to the foreground by clicking on the tile title tab 76.

Returning to the General tile 72 shown in FIG. 5, the Field Editor 70 provides at least one field that may be defined by a user, and in particular a task definer. For example, a name field 78 may be defined. In the example shown, the name field is shown as a field including an employee name. Next, a field type must be defined. This is accomplished using the field type selection window 80. As is shown, a number of different field types may be selected, such as a text box, a check box, a combo box, a list box, a radio button group or a text area. In the example shown, a text box is selected. In addition, a field can be defined as a secure field by selecting the secure field check box 82.

Task Editor

Besides defining a task itself and various options—such as the type of router to be used to route this task, the Task Editor Interface also offers a graphical user interface (GUI) design tool for defining a screen that will be displayed when the task is initiated. Fields defined in the Field Editor can be dropped onto a form and labels and default values assigned.

Figure 6:
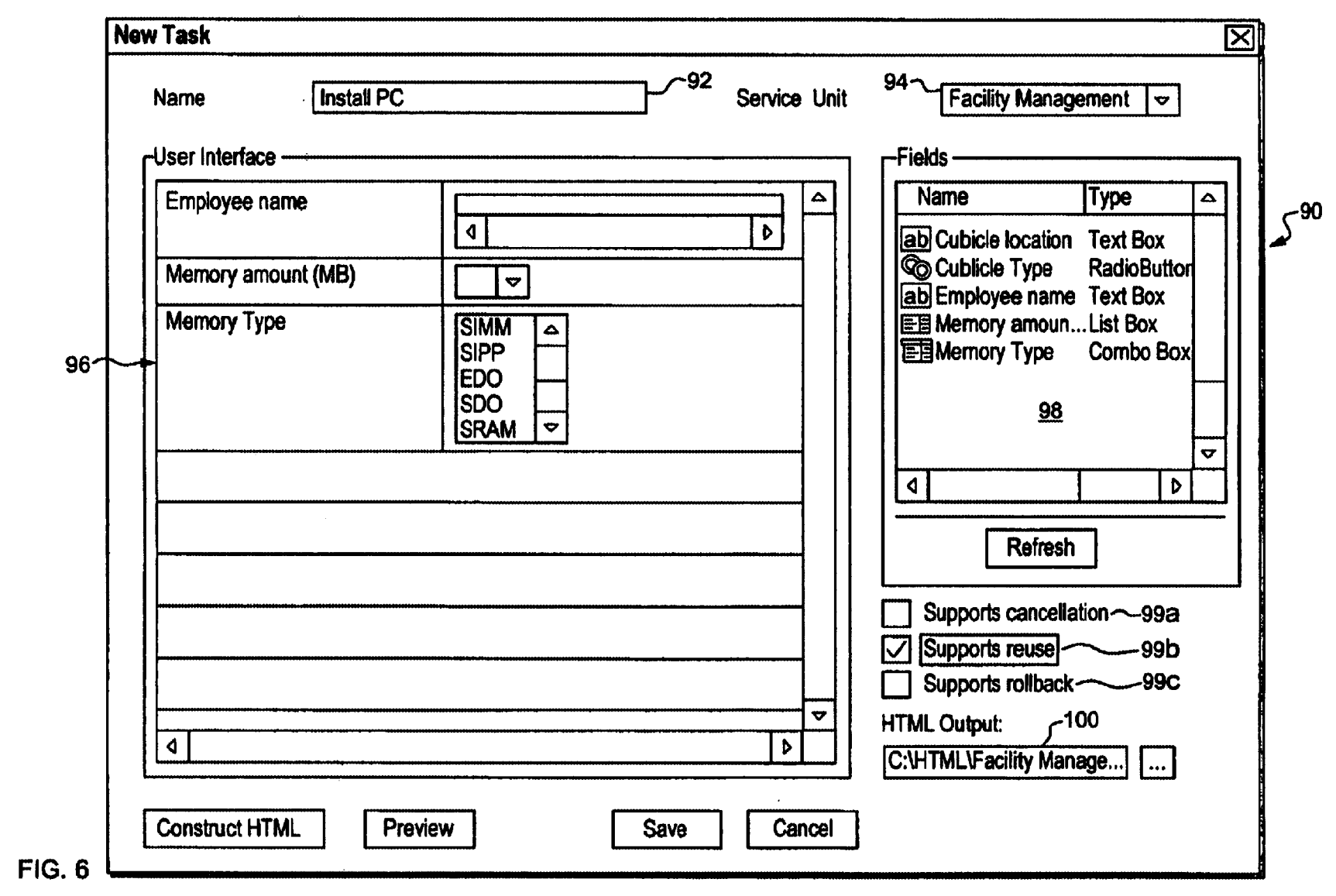

FIG. 6 shows a Task Editor Interface 90. The Task Editor Interface 90 includes a Task Name window 92, in which the name of the task appears. The service unit associated with the Fulfiller who will be responsible for performing the task is provided in task fulfiller window 94. The service unit or an individual task fulfiller assigned to the task may be selected from a list provided or may be directly input using keystroke sequences.

The Task Editor Interface 90 also includes user interface section 96, where the required information associated with the task (which was previously defined using the Field Editor) is entered. In the example shown, the required information includes the employee name, the amount of memory required and the type of memory to be installed in the employee's computer. Also provided is a Fields window 98, where all of the fields available are provided. Additional check boxes, such as check boxes 99a–99c may also be provided. Further, an HTML output window 100 is provided, which provides an indication of where an HTML file associated with the task will be stored.

Task Group Editor

Tasks can be assembled into a task group that can be initiated by the end-user as if it were one entity. Tasks can be a member of more than one task group. When assembling a task group the Task Group Editor automatically determines if different tasks have fields in common. The user fills in a common field only once and the value is shared amongst the various Tasks which require it.

Figure 7:
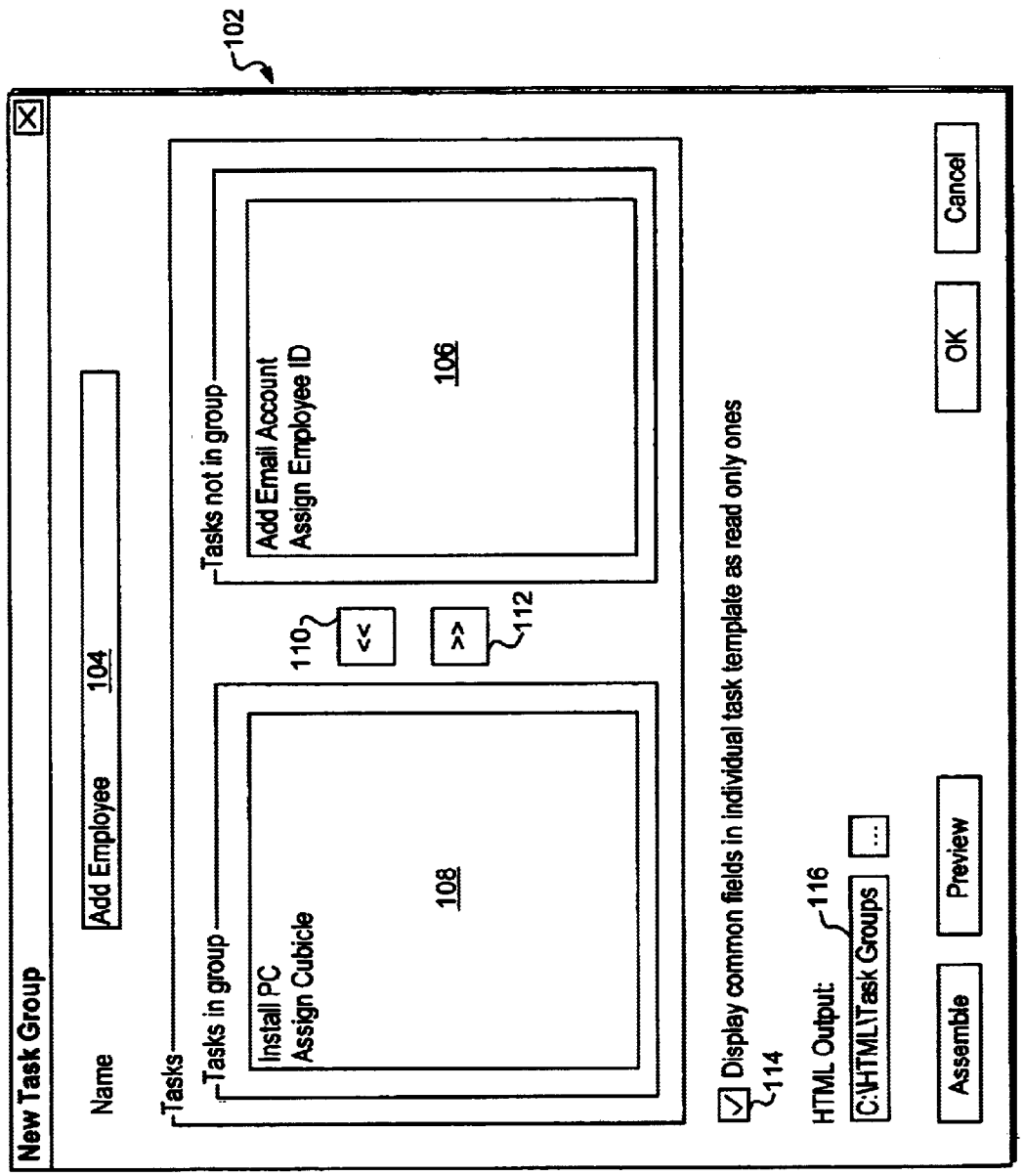
FIG. 7 is a Task Group Editor display according to one embodiment of the present invention.

FIG. 7 shows a Task Group Editor Interface 102. A task group name is assigned in the Task Group Name window 104. All of the tasks that may by included in the task group are initially provided in a "Not-In-Group" window, 106. Tasks that are desired to be included in the task group being created are moved into an "In-Group" window 108 by highlighting a task in the "Not-In-Group" window and selecting the "move-into" icon 110, which moves the highlighted task into the "In-Group" window 108. Conversely, if tasks are to be removed from a task group, they are highlighted where they appear in the "In-Group" window 108 and the "move-out-of" icon 112 is selected, which moves the highlighted task out of the "In-Group" window 108 and into the "Not-In-Group" window 106.

Other selections available in the Task Group Editor display 102 include a Common Field check box 114, which can be selected to display common fields in individual task templates as read only fields. As with the Task Editor display, the Task Group Editor display also includes an HTML output window 116, which displays a storage location for a defined task group.

Sequence Editor

It's not always possible to concurrently execute all the tasks within a task group. For example, consider an "Add Office" task group, which consists of the tasks "Place Desk", "Place Phone", "Place PC". It may be physically impossible to place a PC or a phone before the desk is there, so those tasks should only be executed after "Place Desk" is completed. To solve this issue the task server provides a Sequence Editor, which offers the ability to sequence the execution of tasks within a task group in a particular order. The sequence of execution for a particular task group is defined in the Sequence Editor.

Figure 8:
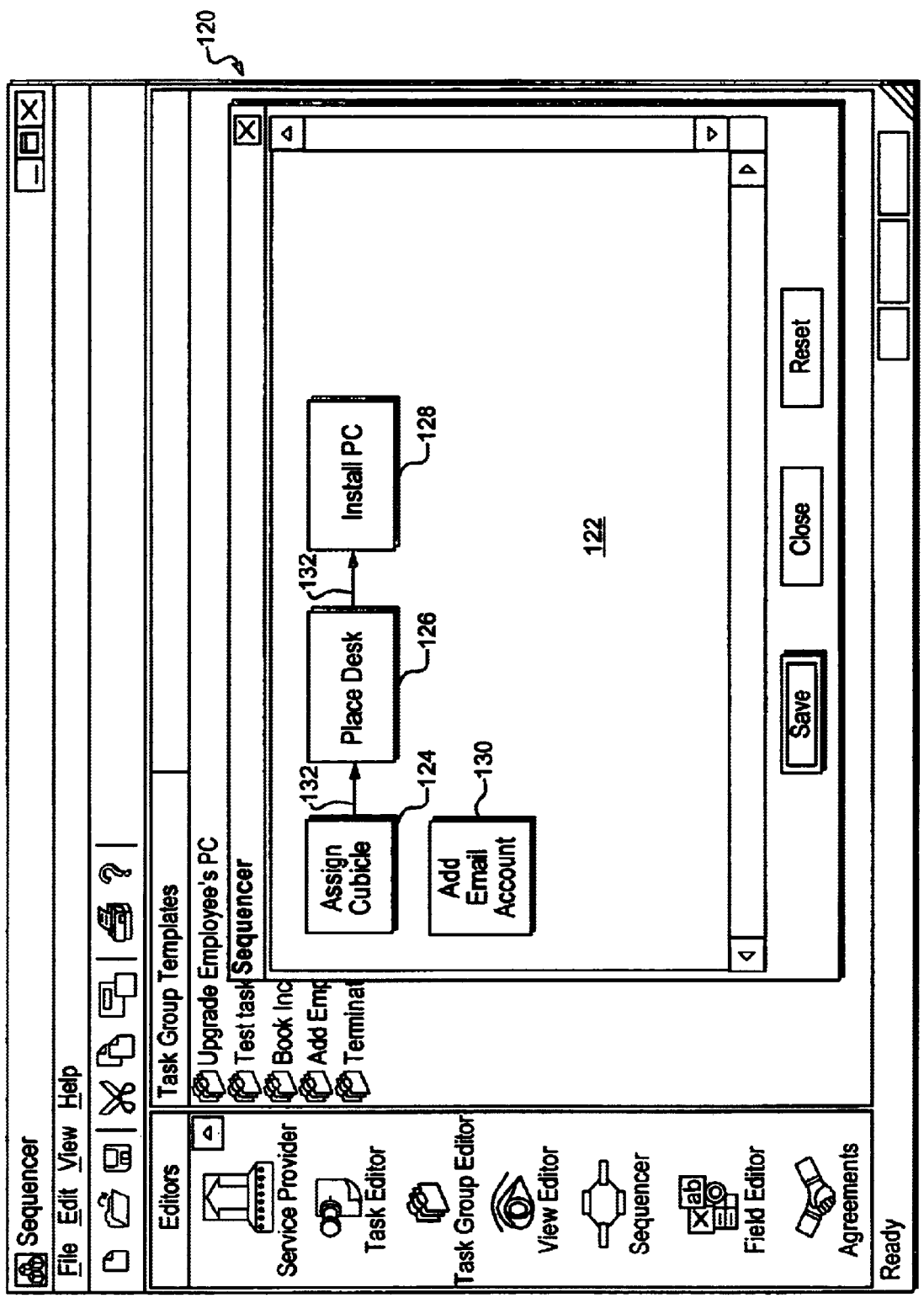
FIG. 8 is a Sequence Editor display according to one embodiment of the present invention.

A Sequence Editor Interface 120 is shown in FIG. 8. The Sequence Editor Interface 120 includes a window 122, where tasks are displayed as icons, such as icons 124, 126, 128 and 130. Icons that are connected using arrows 132, represent tasks that must be performed in sequence. The sequence follows the flow path indicated by the arrows. In the example shown, the Assign Cubicle task 124 must be performed first, followed by the Place Desk task 126, which is thereafter followed by the Install PC task 128. Tasks that are not dependent upon a specific execution sequence are displayed without flow path arrows, such as the Add E-Mail Account task 130, which can be accomplished at any time.

Besides being able to specify the sequence in which tasks in a task group are executed, tasks may also be "conditionally initiated." Conditional initiation is based upon the execution or outcome of a pre-requisite (prior-initiated) task. In other words, based on the outcome of one task or the value of a particular field in a task, a choice can be made as to which task or tasks will be initiated next.

For example, an "Order PC" task would have a field for a system user to select a payment type. Depending on the value of the field, e.g. "purchase order", "credit card", either the task "send invoice" or "process credit card payment" would be initiated next. Specifying conditional execution based on the outcome of a task, e.g. completed successfully or failed, can be done without any programming. Conditional execution based on field values or external criteria, on the other hand, may require some degree of programming. Nonetheless, the task server application programming interface (API) provides all of the necessary functionality to implement any required programming with as little skill and effort as possible.

Service Acceptor Editor

Figure 9:
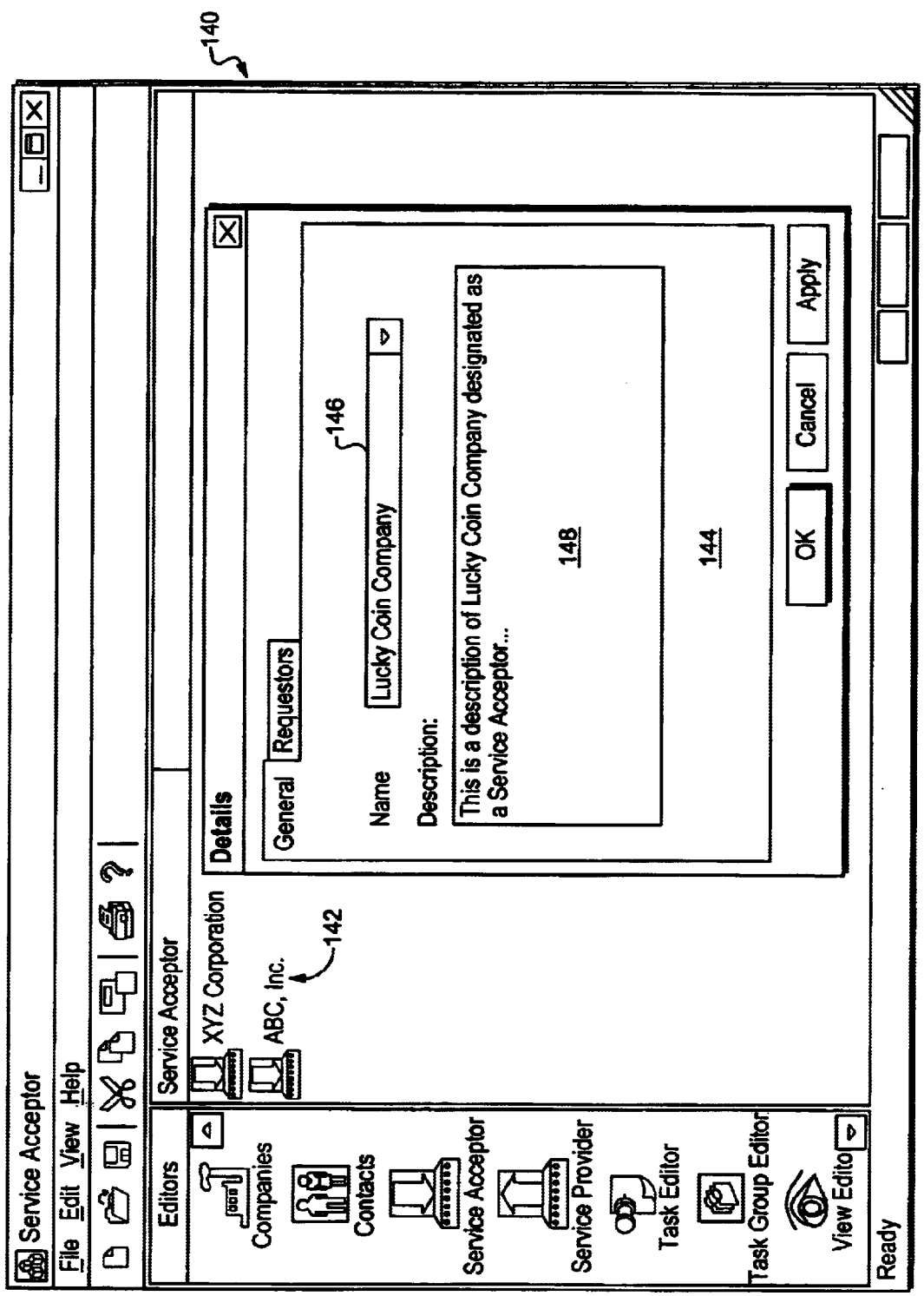
FIG. 9 is a Service Acceptor Editor display according to one embodiment of the present invention.

The Service Acceptor Editor is an editor that configures Service Acceptors and assigns Requestors to them. FIG. 9 shows a Service Acceptor Editor Interface 140. The display includes a list of Service Acceptors 142, such as "XYZ Corporation" and "ABC, Inc." Service Acceptors can be added, deleted or modified using the Service Acceptor Editor Interface 140. The specific details of one of the Service Acceptors can be displayed in the Details window 144 by selecting one of the listed Service Acceptors using an input device. Additionally, a new Service Acceptor, such as the Lucky Coin Company shown, may be designated as a Service Acceptor by selecting it from a list of existing companies in the Service Acceptor name window 146. A description of this new Service Acceptor can be provided in the description window 148.

Service Provider Editor

Figure 10:
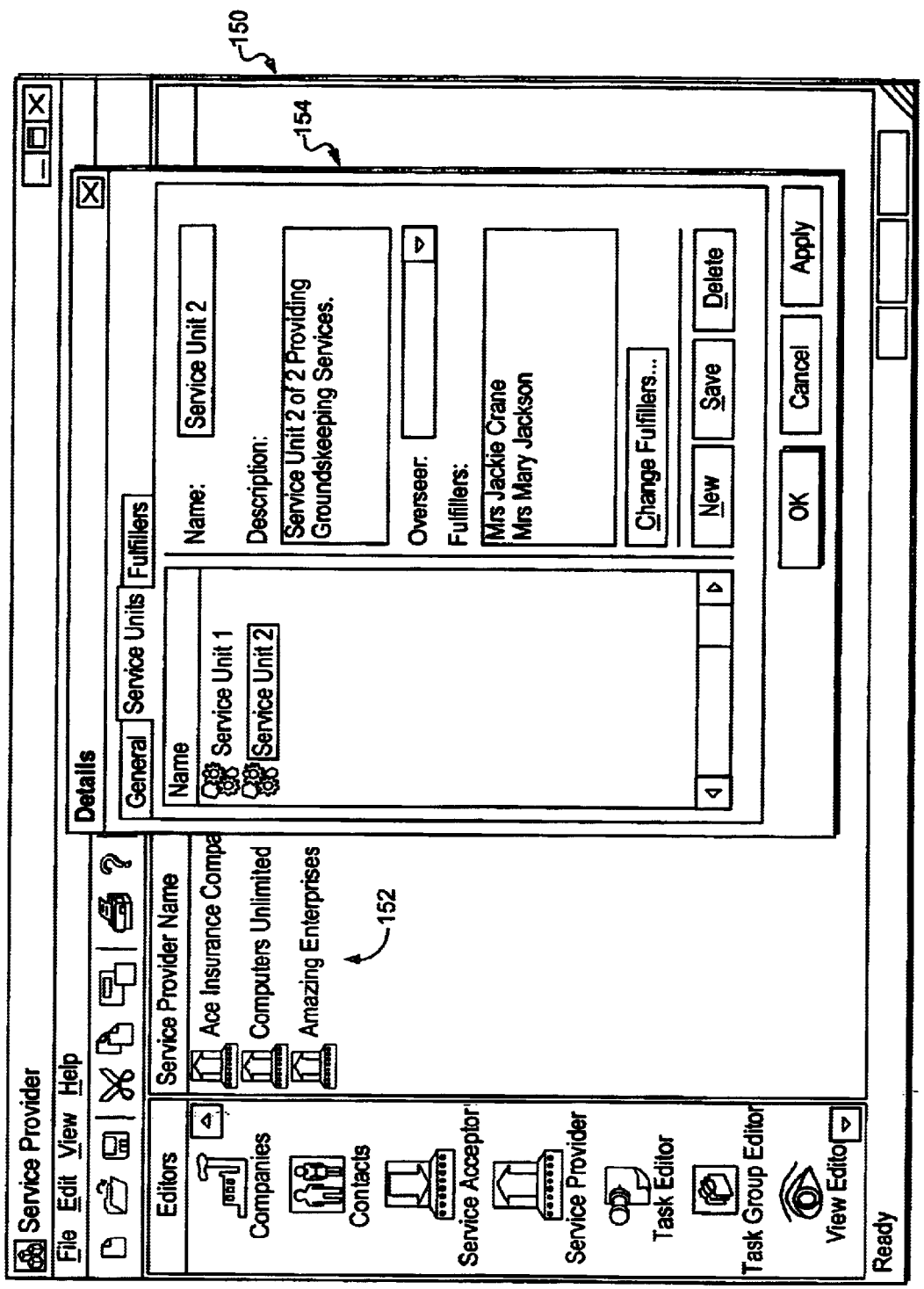
FIG. 10 is a Service Provider Editor display according to one embodiment of the present invention.

The Service Provider Editor Interface is used to configure Service Providers, create Service Units and assign Fulfillers to them. FIG. 10 shows a Service Provider Editor Interface 150. Like the Service Acceptor Editor Interface 140 (FIG. 8), the Service Provider Editor display provides a list of service providers 152. The details of each service provider may be displayed and modified by selecting a specific service provider from list 152. This is accomplished by double clicking on any one of the listed providers, which displays a Service Provider details window 154. The details window 154 includes information related to specific service providers, such as a service unit assigned to perform the specified task, as well as a description of the service unit and the actual Fulfillers who will be responsible for fulfilling an assigned task. Additional Service Providers can be defined using the Service Provider Editor as well.

Agreement Editor

Figure 11:
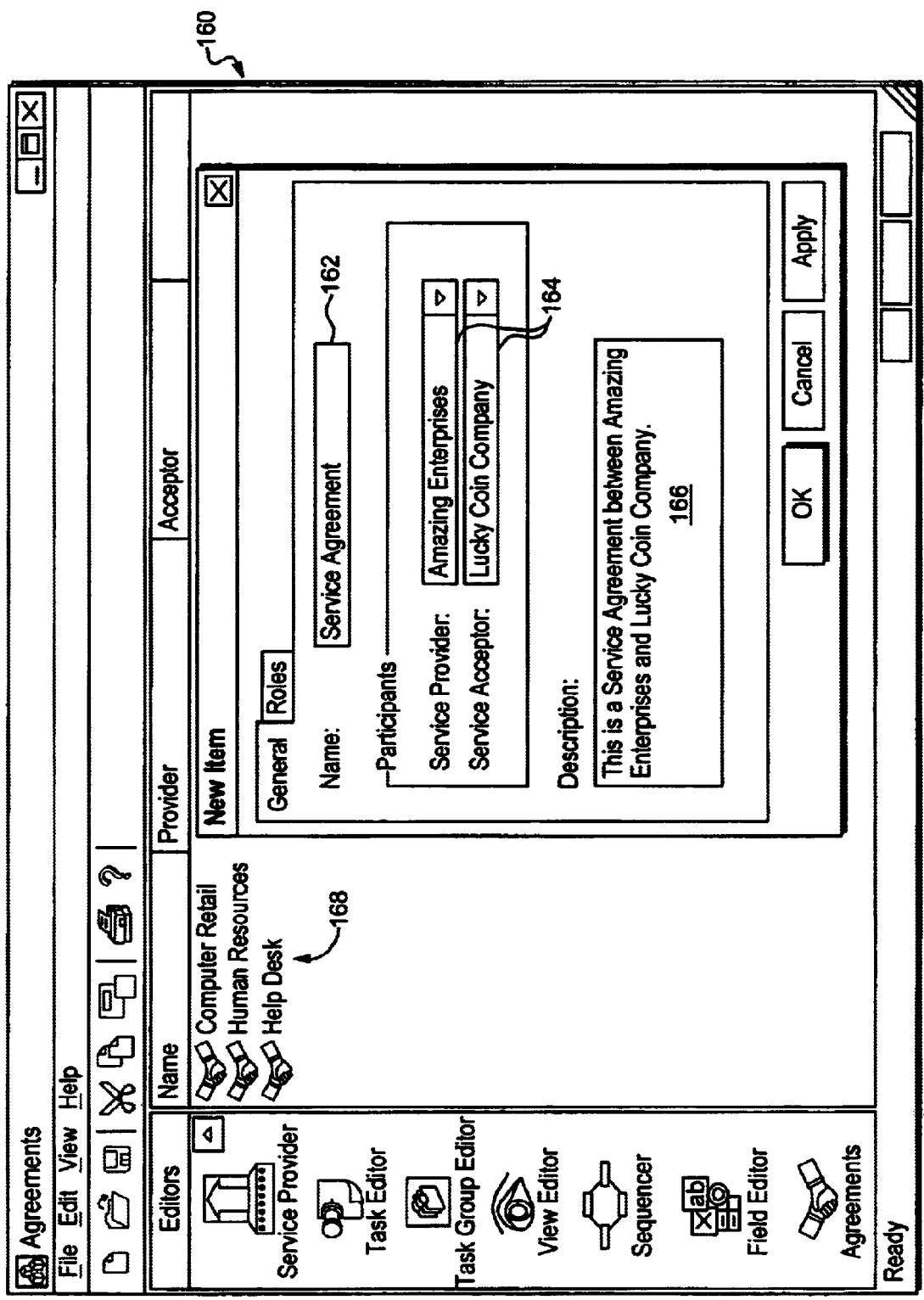
FIG. 11 is an Agreement Editor display according to one embodiment of the present invention.

FIG. 11 shows an Agreement Editor Interface 160. The Agreement Editor establishes agreements between Service Providers and Service Acceptors and facilitates the definition of Roles. As shown, an agreement name can be entered in a name window 162. The participants can be provided in one or more participant windows 164 and a description of the agreement can be provided in a description window 166. A list of all service agreements 168 is also provided.

Roles can also be defined using the Agreement editor. As mentioned above, a Role defines what tasks are available to specific service requesters.

View Editor

Figure 12:
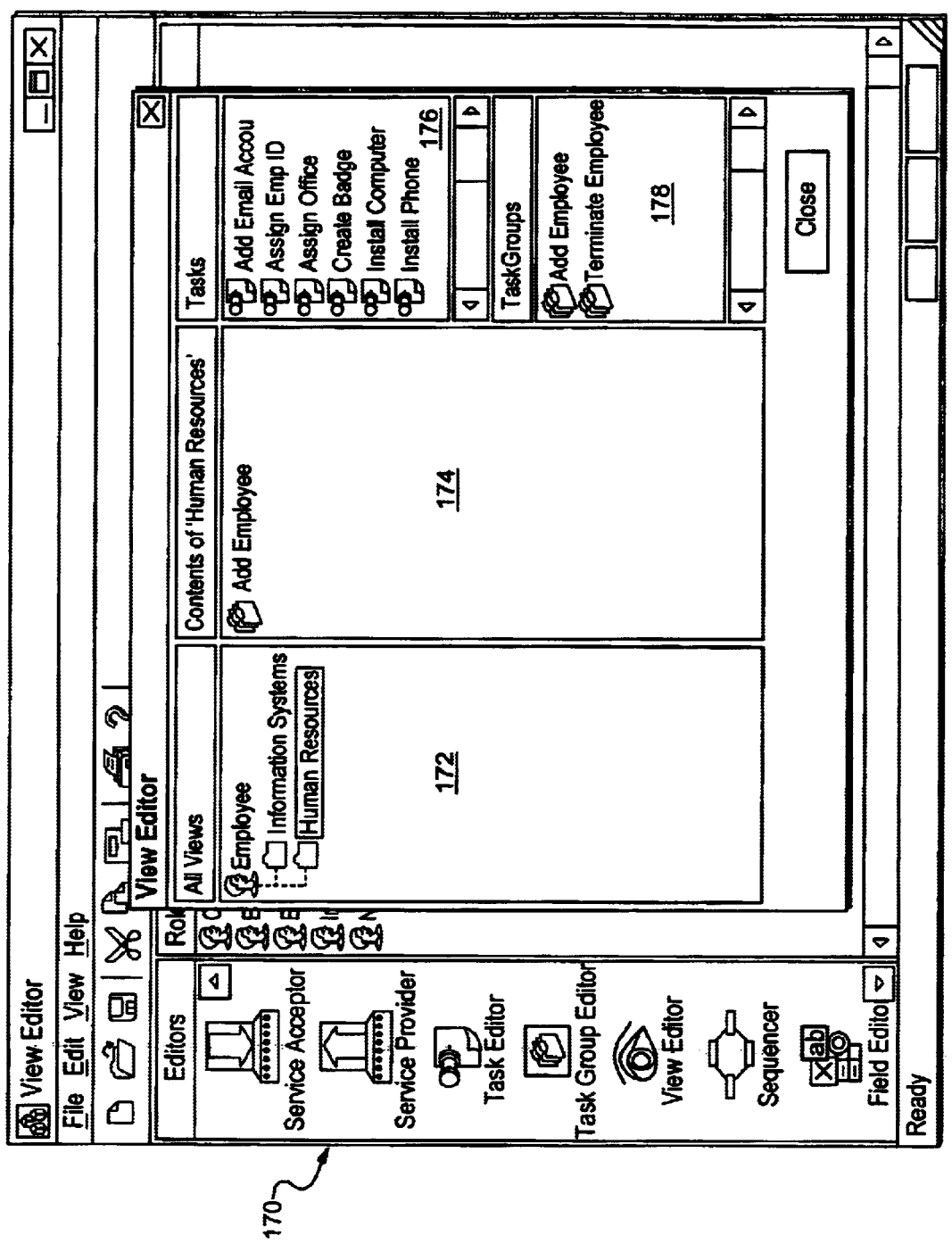
FIG. 12 is a View Editor display according to one embodiment of the present invention.

The View Editor is used to create Views for different Roles. A View consists of View Folders, Tasks and Task Groups. Task and task groups can be organized in a directory-like hierarchy for easy lookup by an end-users. FIG. 12 shows a View Editor Interface 170. The View Editor Interface 170 includes, in a directory-like hierarchical fashion all of the available Views in View window 172. When a particular View is selected, such as the Human Resources View selected in FIG. 12, all of the View folders, Tasks and Task Groups associated with the selected View are displayed in the View Folder window 174. In a similar fashion, all of the tasks available in the task server are displayed in Task Window 176 as well as all of the task groups that are available in the task server, which are displayed in Task Group Window 178.

General Editors

Figure 13:
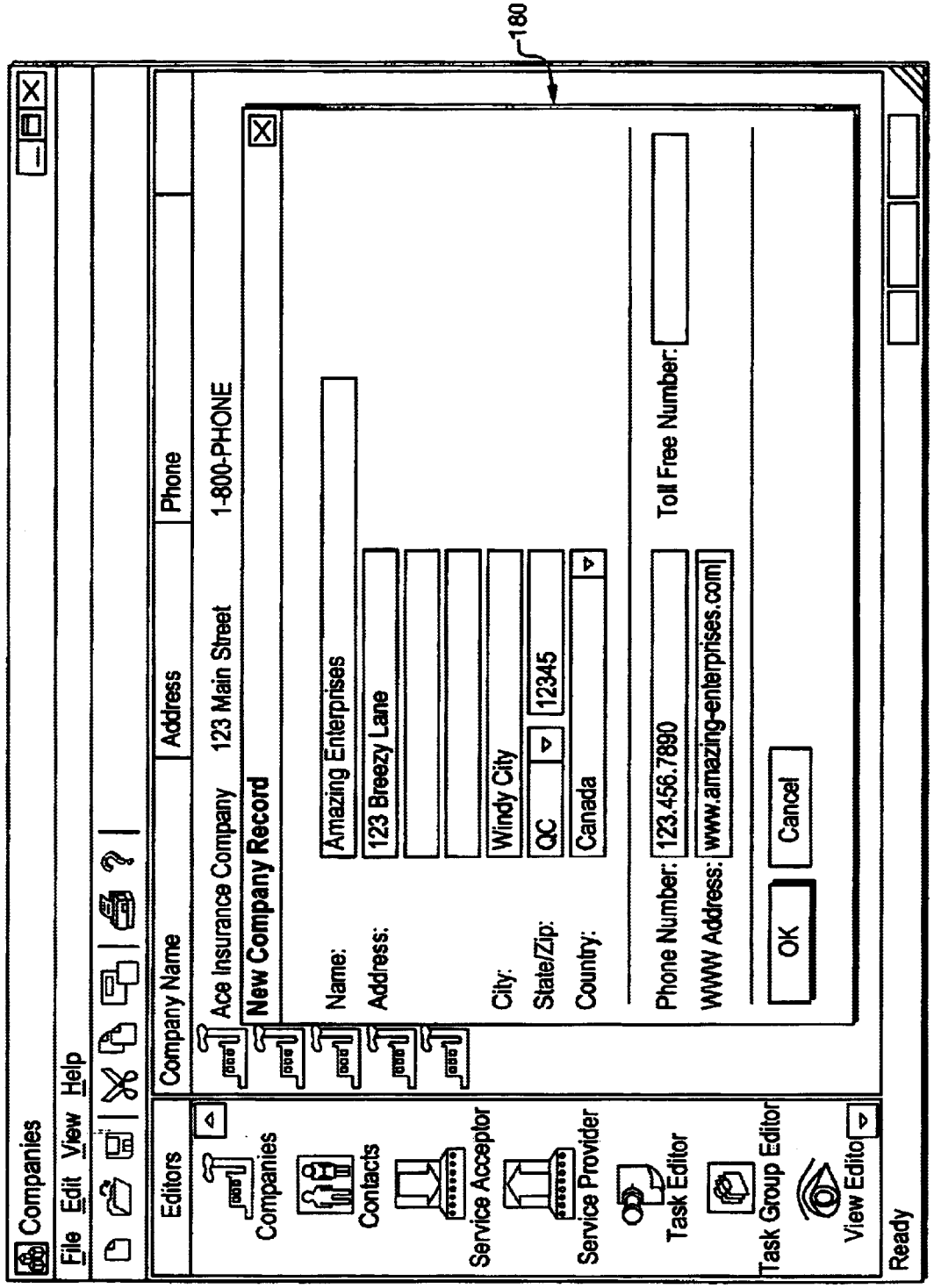
FIG. 13 is a Company Editor display according to one embodiment of the present invention.

The Company Editor provides one general editor interface for entering company information. A company can be a Service Provider or a Service Acceptor. FIG. 13 shows a Company Editor Interface 180, which allows information associated with a company, such as name, address, phone number, Internet address, etc. to be entered.

Like the Company Editor, the Contact Editor is also a general editor. The Contact Editor allows for the entry of contact information. Among other things, a contact can be a Requestor or a Fulfiller. FIG. 13 shows a Contact Editor display 190.

All the Administrative Editors run inside a common framework. The framework automatically determines which editors are available and loads them accordingly. The editors on the other hand do not need to know anything about the framework, they just need to expose a standard interface so that the framework recognizes. This makes it very easy for third-party developers to add their own editors for configuring custom business objects.

The task server provides a component based architecture, which is based on Microsoft's COM/DCOM architecture. This is the framework of Microsoft's Distributed Internet Architecture. Using COM offers numerous advantages.

For Example, using COM enables third-party developers to write business objects in their preferred language, such as Visual Basic 5.0, Visual C++ with MFC or ATL, PowerBuilder and Visual J++.

Also, existing components in the task server can be easily replaced by a custom designed component to implement specific behavior. For example, a particular group of tasks might require an aberrant routing scheme. A third-party vendor can substitute the default router from the task server's engine with it's own implementation without touching any of the other core engine components, as long as it implements the same interface methods as the default router. The new router object can be added to the task server without recompiling any other component.

In addition, using Transaction Server, transactions can easily be spawned across multiple COM components, ensuring a very robust environment.

Application Programming Interface (API)

As mentioned earlier, before using the task server, it needs to be tailored to a specific organization. Tasks need to be created, Task Groups assembled, Service Providers, Agreements, Roles and Views defined, etc. This can be accomplished with the Editors described above. Once the system is tailored, then human Requestors and Fulfillers can start using the system to automate tasks. In other words, the task server can be used to automate tasks without writing a single line of programming code.

An equally powerful aspect of the task server is the fact that anything that can be done with these editors, human Requestors or Fulfillers can be performed by other software application. This is due to the fact that the task server exposes an Application Programming Interface (API). Any application that can invoke a COM interface can subscribe to the services of the disclosed task server. It is this feature that makes the disclosed task server a true task "Server."

The implications of this are huge. A "passive" sales automation product, for example, can add active task automation. When a sales rep closes a sale, he can initiate a Task Group that contains tasks for the shipping department to ship the product and the accounting department to send the bill.

Task Server Extensions

The task server's functionality can be extended by replacing existing components, using software Requestors/Fulfillers or by adding new components. These components can be written in almost any language such as C++ or Visual Basic. A few examples are given below:

The component that performs the assignment of Tasks arriving at a Service Unit currently uses a set of rules to assign the Tasks among Fulfillers associated with that Service Unit. If a particular customer wants to use a different set of rules for this assignment, he can replace this component with one developed by him that incorporates his specific rules.

Since Fulfillers can be software objects, a system user can associate user written Fulfillers with a Service Unit. Tasks arriving at this Service Unit are forwarded to this Fulfiller Object which can contain any user defined functionality.

Consider an example of a web site operated by a company that provides information about the company's products and services. It presents a form to the visitor of the web site to capture information about the visitor, such as name, age, zip code, products and services of interest, if the visitor wants brochures sent to him or her, etc. Such a system can implement task automation in the following way.

A Task is defined that can contain the user supplied information. In other words, this task will have a field corresponding to each field in the form presented to the visitor. When the form is submitted by the user, the web application Requests this Task. Fields required by the Task are programmatically filled in by the web application.

This Task is routed to its Service Unit. This service unit has a Visual Basic Fulfiller associated with it.

This Visual Basic Fulfiller object performs the following after analyzing the information it receives:

If a brochure is requested by the web visitor, it Requests a Send Brochure Task. This Task is routed a Service Unit which has employees associated with it One of these employees will fulfill the brochure request.

If a sales call is warranted, it initiates Make Sales Call Task which will be fulfilled by an appropriate sales rep.

Stores pertinent data in a statistical database.

New objects can increase the usability of the task server. Consider a Telephony object that can dial a telephone number. Consider the previous example where a sales rep has a Task to make a sales call to a prospect. If the Telephony application is available and is attached to the Fulfiller Task screen, he can initiate the telephone call to the prospect with a click of a button. These kinds of objects increase the power and flexibility of the solutions that can be created with the disclosed task server.

Mobile Computing

The disclosed task server supports file synchronization with hand held devices such as the Palm Pilot and Windows CE machines. Tasks appear as To Do items on the mobile device. When the user checks the To Do item, the corresponding Task on the task server is marked as completed when the user synchronizes the next time.

The Internet architecture provides global connectivity for task server users. The mobile computing support provides un-tethered operation. This provides "Go anywhere connect everywhere" capability.

Simple Flexible and User Customizable Task Routing

The task server of the present invention provides a very simple routing mechanism for tasks that works the following way:

First, a given instance of a task is routed to a Service Unit associated with that Task. Next, the tasks arriving at Service Unit are assigned to a Fulfiller associated with that Service Unit. At first glance this might seem like a very limited task routing scheme. This is not the case. Since Fulfillers can be software objects, they can also act as secondary routers. This allows the construction of very powerful, user definable, task specific routing schemes.

Again, consider the following example of a document routing and approval system.

A "Circulate Document" task is used by a document author to specify the document and the list of recipients. This task is routed to a Service Unit that utilizes a custom developed Document Router. The Document Router uses an "Approve Document" task to send the document to the first person in the list. When it is approved, it is send to the second one on the list and so on. When the document is approved by everyone on the list, the original "Circulate Document" task is marked as completed by the Document Router.

Turnkey Systems

Third party developers can use the disclosed task server to create turnkey solutions for vertical and horizontal markets such as human resources, help desk, etc. in the following ways:

Use the supplied editors to create tasks, task groups, roles, routing, etc. At this level, no programming is required yet you can create a significant amount of automation within a short period of time. You should be able to electronically mimic most any manual paper routing systems.

Use the editors and custom developed objects to create elaborate turnkey systems such as Help Desk, Bug Tracker, Document Routing System, Signature Authorization System, etc.

Use custom programming and the task server API to extend the functionality of existing applications to form new or improved turnkey systems.

Task Server Explorer

The disclosed task server provides an application development environment called the Task Server Explorer. It helps organize components, Tasks, Task Groups, Agreements, Views, etc. into groups. This allows, for example, all the items that are part of a Help Desk turn key system into a group. Task Server Explorer can be used to create an Installation Kit for the Help Desk system, and to install it on a target system.

Task Server Explorer displays the task server in a tree format. Folders can represent the core task server system as well each of the turnkey systems installed.

Distributed Internet Architecture

The disclosed task server is built from the ground up using Microsoft's Distributed Internet Architecture (DNA). This means that the task server offers a browser-based front-end for end-users which results in location independence (any PC with a browser can access the task server) and eliminates installation and maintenance hassles. Other DNA advantages include easy UI (user interface) redesign, scalability and centralized upgrades.

Browser user interfaces used to have a clumsy look-and-feel in the HTML only days. However with the arrival of ActiveX Controls, Remote Data Services (RDS previously known as Advanced Data Connector) and Dynamic HTML, users can now enjoy a UI that comes close to a Windows-based GUI.

As a web-server, the disclosed task server uses the Microsoft Internet Information Server 4.0. Its tight integration with the NT operation system offers high performance and robustness. IIS 4.0 also boasts Active Server Pages (ASP), Microsoft's server-side scripting language that has in essence become the standard for developing dynamic web pages.

In the task server, ASP is only a very thin layer; all the real functionality is encapsulated in COM components. This not only hides proprietary code from customers, but also offers all the advantages as described in the section Component-based Architecture.

In terms of maintainability, extensibility and performance it is a commonly known fact that a three-layer architecture that separates data from the user interface is the best choice. However due to development complexities, especially of the middle-tier, these types of systems tend to have a long development cycle and are very bug prone. To avoid this pitfall the task server uses Transaction Server, Microsoft's out-of-the-box middle-tier product. Transaction Server supports transactions spawned over multiple databases, is designed to use COM components and also integrates with Internet Information Server 4.0 by offering transaction support across multiple ASP pages.

Most of the components that make up Task Server 2000 will run inside the Transaction Server, which will provide maximum scalability and performance.

The back-end is currently Microsoft SQL Server. It can be easily replaced by Sybase SQL Server running on a Unix machine.

Accordingly, the disclosed task server represents a new class of software that provides "Task" based services. It provides a complete set of methods, abstractions, techniques and tools to accomplish these services.

Modifications and substitutions by one of ordinary skill in the art are considered to be within the scope of the present invention which is not to be limited except by the claims which follow.

What is claimed is:

1. An automated method for assigning, routing and monitoring a plurality of tasks to be performed to complete a desired project, said method comprising the acts of:

defining a plurality of tasks that may be performed to complete a project, at least one of said plurality of tasks having a condition precedent;

selecting certain tasks from the plurality of defined tasks that need to be completed to accomplish the desired project;

automatically sequencing the selected certain tasks in an order in which the tasks need to be completed;

automatically identifying the certain tasks that have a condition precedent;

assigning a deadline date on each selected and sequenced task to be completed;

automatically assigning each of the tasks to an automated task fulfiller;

initiating a first task in said sequenced order by said automated task fulfiller;

automatically monitoring the completion of said first and subsequent sequenced tasks by said automated task fulfiller;

automatically ascertaining that a condition precedent in one selected sequenced task has been completed before a subsequent selected sequenced task is initiated by said automated task fulfiller;

determining by said automated task fulfiller a preselected number of days before said deadline date that an assigned and sequenced task is outstanding; and automatically issuing a notification by said automated task fulfiller if the automated task fulfiller has not been able to complete the assigned task by the deadline date.

2. The method of claim 1 wherein said act of defining a plurality of tasks that may be performed to complete a project further includes defining at least one task group, said at least one defined task group including a plurality of tasks related to the completion of a predetermined project.

3. The method of claim 1, further comprising the act of automatically indicating by said automated task fulfiller that all the tasks for the project have been completed.

4. The method of claim 1 wherein the act of automatically issuing a notification by said automated task fulfiller if the automated task fulfiller has not been able to complete the assigned task by the deadline date includes the act of notifying a supervisor that said automated task fulfiller has not been able to complete the assigned task by the deadline date.

5. The Method of claim 1 wherein the act of automatically issuing a notification by said automated task fulfiller if the automated task fulfiller has not been able to complete the assigned task by the deadline date includes the act of automatically sending a message a preselected number of days before the deadline date said message indicating that the deadline date is approaching.

6. An automated method for assigning, routing and monitoring a plurality of tasks to be performed to complete a desired project, said method comprising the acts of:

defining a plurality of tasks that may be performed to complete a project, at least one of said plurality of tasks having a condition precedent;

selecting certain tasks from the plurality of defined tasks that need to be completed to accomplish the desired project;

automatically sequencing the selected certain tasks in an order in which the tasks need to be completed;

defining at least one task group, said at least one defined task group including a plurality of sequenced tasks related to the completion of a predetermined project automatically identifying the certain tasks that have a condition precedent;

assigning a deadline date on each selected and sequenced task to be completed;

automatically assigning each of the tasks to an automated task fulfiller;

initiating a first task in said sequenced order by said automated task fulfiller;

automatically monitoring the completion of said first and subsequent sequenced tasks by said automated task fulfiller;

automatically ascertaining that a condition precedent in one selected sequenced task has been completed before a subsequent selected sequenced task is initiated by said automated task fulfiller;

determining by said automated task fulfiller a preselected number of days before said deadline date that an assigned and sequenced task is outstanding; and automatically issuing a notification by said automated task fulfiller if the automated task fulfiller has not been able to complete the assigned task by the deadline date.

7. An automated method for assigning, routing and monitoring a plurality of tasks to be performed to complete a desired project, said method comprising the acts of:

defining a plurality of tasks that may be performed to complete a project;

selecting certain tasks from the plurality of defined tasks that need to be completed to accomplish the desired project;

automatically sequencing the selected certain tasks in an order in which the tasks need to be completed;

assigning a deadline date on each selected and sequenced task to be completed;

automatically assigning each of the tasks to an automated task fulfiller;

initiating a first task in said sequenced order by said automated task fulfiller;

automatically monitoring the completion of said first and subsequent sequenced tasks by said automated task fulfiller;

determining by said automated task fulfiller a preselected number of days before said deadline date that an assigned and sequenced task is outstanding; and automatically issuing a notification by said automated task fulfiller if the automated task fulfiller has not been able to complete the assigned task by the deadline date.

* * * * *